(12) United States Patent
Kawamura et al.

(10) Patent No.: US 10,705,752 B2
(45) Date of Patent: Jul. 7, 2020

(54) EFFICIENT DATA MIGRATION IN HIERARCHICAL STORAGE MANAGEMENT SYSTEM

(71) Applicant: INTERNATIONAL BUSINESS MACHINES CORPORATION, Armonk, NY (US)

(72) Inventors: Kousei Kawamura, Tokyo (JP); Koichi Masuda, Tokyo (JP); Sosuke Matsui, Tokyo (JP); Shinsuke Mitsuma, Tokyo (JP); Takeshi Nohta, Tokyo (JP); Takahiro Tsuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 15/894,131

(22) Filed: Feb. 12, 2018

(65) Prior Publication Data

US 2019/0250844 A1 Aug. 15, 2019

(51) Int. Cl.
*G06F 3/06* (2006.01)

(52) U.S. Cl.
CPC .......... *G06F 3/0649* (2013.01); *G06F 3/0613* (2013.01); *G06F 3/0683* (2013.01)

(58) Field of Classification Search
CPC ..... G06F 3/0649; G06F 3/0613; G06F 3/0683
See application file for complete search history.

(56) References Cited

U.S. PATENT DOCUMENTS

| | | | |
|---|---|---|---|
| 8,645,660 B2 * | 2/2014 | Parham | G06F 3/061 |
| | | | 711/173 |
| 8,832,031 B2 | 9/2014 | Kavuri et al. | |
| 8,965,856 B2 | 2/2015 | Kawaguchi | |
| 8,972,695 B2 * | 3/2015 | Parham | G06F 3/061 |
| | | | 711/173 |
| 9,189,421 B2 | 11/2015 | Testardi et al. | |
| 9,218,136 B2 * | 12/2015 | Parham | G06F 3/061 |
| 9,268,489 B2 | 2/2016 | Aizman et al. | |
| 9,336,233 B2 * | 5/2016 | Chatley | G06F 3/0613 |

(Continued)

FOREIGN PATENT DOCUMENTS

CN 102880531 A 1/2013

OTHER PUBLICATIONS

Spiceworks, "Hierarchical Storage Management Off-the-Shelf Solutions", Jan. 14, 2015, 10 Pages, Spiceworks, Inc., https://community.spiceworks.com/topic/736772-hierarchical-storage-management-off-the-shelf-solutions.

(Continued)

*Primary Examiner* — Christopher D Birkhimer
(74) *Attorney, Agent, or Firm* — Kenneth Han

(57) ABSTRACT

Embodiments provide a method, a system, and a computer program product for performing copy operations of one or more data units in a hierarchical storage management (HSM) system. The HSM system includes an upper layer and a lower layer. The upper layer includes multiple storage nodes having a grid configuration. The method comprises scheduling a copy operations of multiple data units each of which is stored in at least one of the multiple storage nodes such that loads on the copy operations are distributed among the multiple storage nodes in which the multiple data units are stored and copying the multiple data units to the lower layer in accordance with the scheduling.

25 Claims, 11 Drawing Sheets

(56) References Cited

U.S. PATENT DOCUMENTS

| | | |
|---|---|---|
| 9,454,328 B2 | 9/2016 | Lim et al. |
| 9,626,245 B2* | 4/2017 | Bakre ................. G06F 11/1076 |
| 9,705,979 B2* | 7/2017 | Chatley ................. G06F 3/0613 |
| 2004/0098424 A1 | 5/2004 | Seidenberg |
| 2011/0213755 A1 | 9/2011 | Kavuri et al. |
| 2013/0054894 A1 | 2/2013 | Kawaguchi |
| 2013/0246711 A1 | 9/2013 | Testardi et al. |
| 2014/0149702 A1* | 5/2014 | Parham ................. G06F 3/061 711/162 |
| 2014/0172807 A1* | 6/2014 | Chatley ................. G06F 3/0613 707/694 |
| 2014/0223135 A1* | 8/2014 | Parham ................. G06F 3/061 711/173 |
| 2015/0006957 A1* | 1/2015 | Ginzinger ............. G06F 3/0605 714/15 |
| 2015/0052214 A1 | 2/2015 | Zhao |
| 2015/0178016 A1 | 6/2015 | Lim et al. |
| 2015/0193164 A1 | 7/2015 | Aizman et al. |
| 2016/0117259 A1 | 4/2016 | Hasegawa et al. |
| 2016/0246676 A1* | 8/2016 | Bakre ................. G06F 11/1076 |
| 2016/0350011 A1* | 12/2016 | Parham ................. G06F 3/061 |
| 2016/0359963 A1* | 12/2016 | Chatley ................. G06F 3/0613 |
| 2016/0359976 A1* | 12/2016 | Chatley ................. G06F 3/0613 |
| 2017/0139640 A1* | 5/2017 | Bakre ................. G06F 11/1076 |

OTHER PUBLICATIONS

Lakshmi et al., "Proactive and Adaptive Data Migration in Hierarchical Storage Systems Using Reinforcement Learning Agent", International Journal of Computer Applications, May 2014, 7 Pages, vol. 94, No. 9, Mumbai, India.

Mell et al., "The NIST Definition of Cloud Computing", NIST, Sep. 2011, 7 Pages, Special Publication 800-145, U.S. Department of Commerce, Gaithersburg, MD.

\* cited by examiner

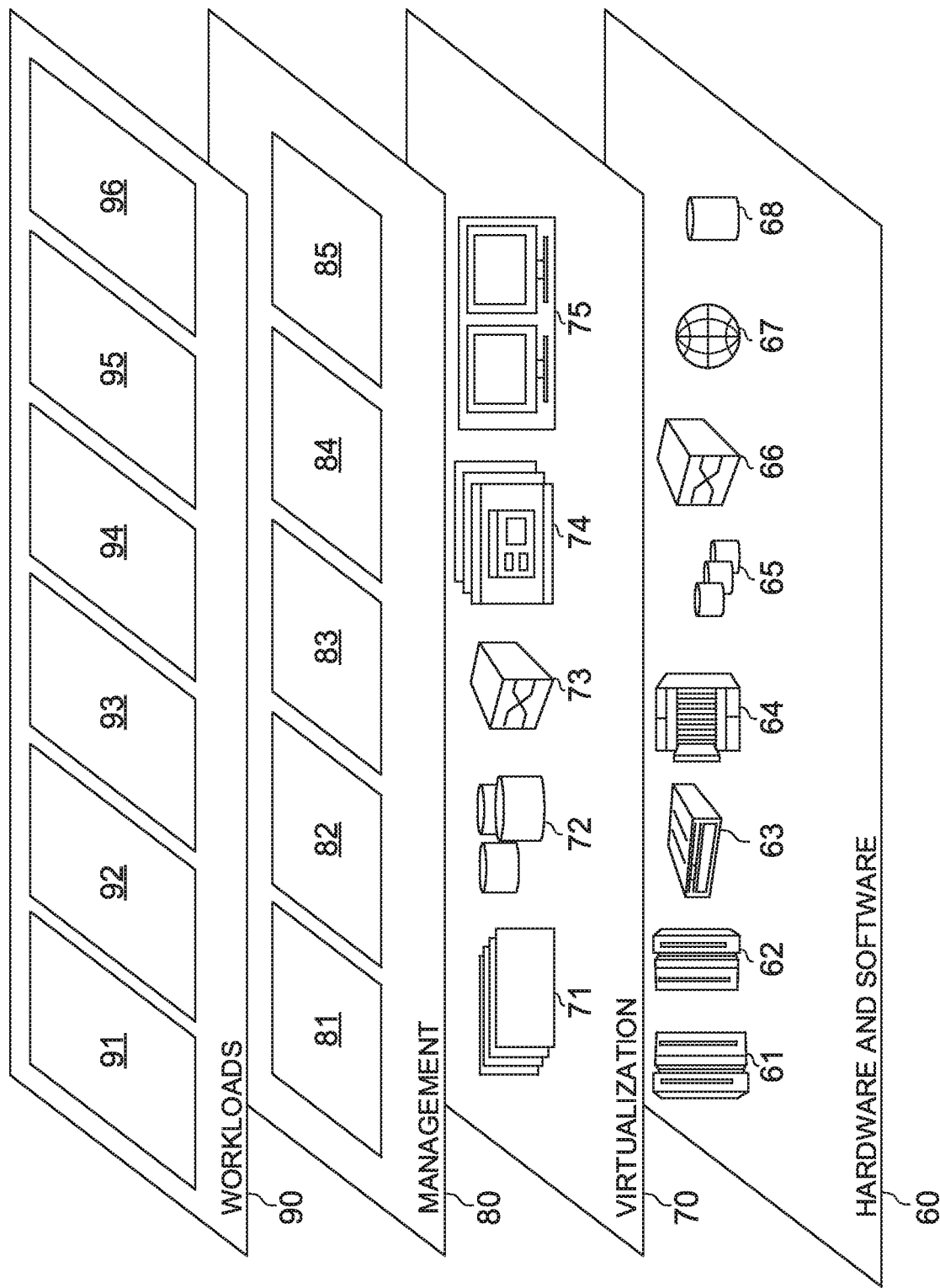

EFFICIENT DATA MIGRATION IN HIERARCHICAL STORAGE MANAGEMENT SYSTEM

BACKGROUND

The present invention relates generally to hierarchical storage management, and more particularly to data migration management in a hierarchical storage management system.

Hierarchical Storage Management (HSM) is a data storage technique that provides efficient and cost-effective data management by utilization of fast, high-cost storage media, such as for primary storage, in addition to slow, low-cost storage media, such as for secondary storage. The primary and secondary storage may be, for example, tiered, layered, or otherwise hierarchically arranged, such as in a high-access speed upper layer and a low-access speed lower layer, respectively, to facilitate data retrieval, read/write operation, and the like. For example, the IBM® TS7700 storage system and the IBM® Spectrum Archive Enterprise Edition HSM system may utilize SSD or HDD data storage devices for primary storage, and tape storage devices for secondary storage. Certain HSM systems use cloud technologies, such as the IBM® TS7700 series tape virtualization product, to enable use of cloud data storage for secondary storage.

A conventional HSM technique may provide an HSM scheme by which frequently accessed data may be stored, for example, in a primary disk storage device arranged in an upper layer of an HSM system, in order to facilitate high availability and access of the data. The frequently accessed data may remain in the upper layer until, for example, an access request frequency of the data falls below a predetermined threshold. For example, where the access request frequency of the data falls below the predetermined threshold, a pre-migration operation may be performed by which the data may be copied, and subsequently, a migration operation may be performed by which the data may be removed for transfer to a lower layer for storage. The data, along with other unfrequently accessed data stored in the lower layer, may be transferred to the upper layer by way of a recall operation. Accordingly, pre-migration, migration, and recall operations may be implemented to provide efficient and high-speed data access for users of the HSM system.

SUMMARY

In an embodiment, a method for performing copy operations of one or more data units in a hierarchical storage management system is provided. The hierarchical storage management system may include an upper layer and a lower layer. The upper layer includes multiple storage nodes having a grid configuration. The method comprises scheduling copy operations of multiple data units, each of which is stored in at least one of the multiple storage nodes such that loads on the copy operations are distributed among the multiple storage nodes in which the multiple data units are stored. The method further comprises performing the copy operations of the multiple data units to the lower layer in accordance with the scheduling. Advantageously, this enables optimized system-level performance and throughput of the hierarchical storage management system by management of applied workload with respect to each of the storage nodes, and coordination of individual storage node operations.

In an embodiment, a storage controller connectable to a hierarchical storage management system is provided. The hierarchical storage management system may include an upper layer and a lower layer. The upper layer may include multiple storage nodes having a grid configuration. The controller comprises a memory; and a processor communicatively coupled to the memory. The memory comprises instructions which, when executed by the processor, causes the processor to: schedule copy operations of multiple data units each of which is stored in at least one of the multiple storage nodes such that loads on the copy operations are distributed among the multiple storage nodes in which the multiple data units are stored; and copy the multiple data units to the lower layer in accordance with the scheduling. Advantageously, this enables optimized system-level performance and throughput of the hierarchical storage management system by management of applied workload with respect to each of the storage nodes, and coordination of individual storage node operations.

In an embodiment, a computer program product for use in a hierarchical storage management system is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

In an embodiment, the provided method may further comprise receiving, from a computing device connected to the management system, a write request corresponding to a data unit, wherein the data unit comprises an associated copy policy; and executing the request to perform a write operation corresponding to the data unit, wherein the request is executed in accordance with the copy policy and with respect to one or more of the storage nodes. Advantageously, the copy policy enables data-specific control over storage redundancy of corresponding data units in the management system.

In an embodiment, the provided method may further comprise selecting, by a storage node in the domain, one or more of the storage nodes in the domain for the performance of the copy operations with respect to a corresponding data unit to be copied, wherein the storage nodes are selected based on: a determination that a copy of the data unit to be copied is stored in one or more of the storage nodes, wherein a copy operation has not been performed on the data unit for an amount of time exceeding a predetermined threshold; or a determination that the storage node itself stores the copy of the data unit to be copied, wherein a number of copies of the data unit is less than that stored in any of the other storage nodes in the domain. Advantageously, this provides a "safety-net" for situations where, for example, another cluster having a copy of the identified data volume and fails to migrate the volume for whatever reason.

The above-mentioned aspects of the present invention are not intended to enumerate all of the required features of the present invention, and it is to be understood that the present invention includes all combinations and sub-combinations of these constituent elements.

BRIEF DESCRIPTION OF THE DRAWINGS

FIG. 10 illustrates cloud abstraction model layers according to embodiments of the present invention.

DETAILED DESCRIPTION

Figure 1:
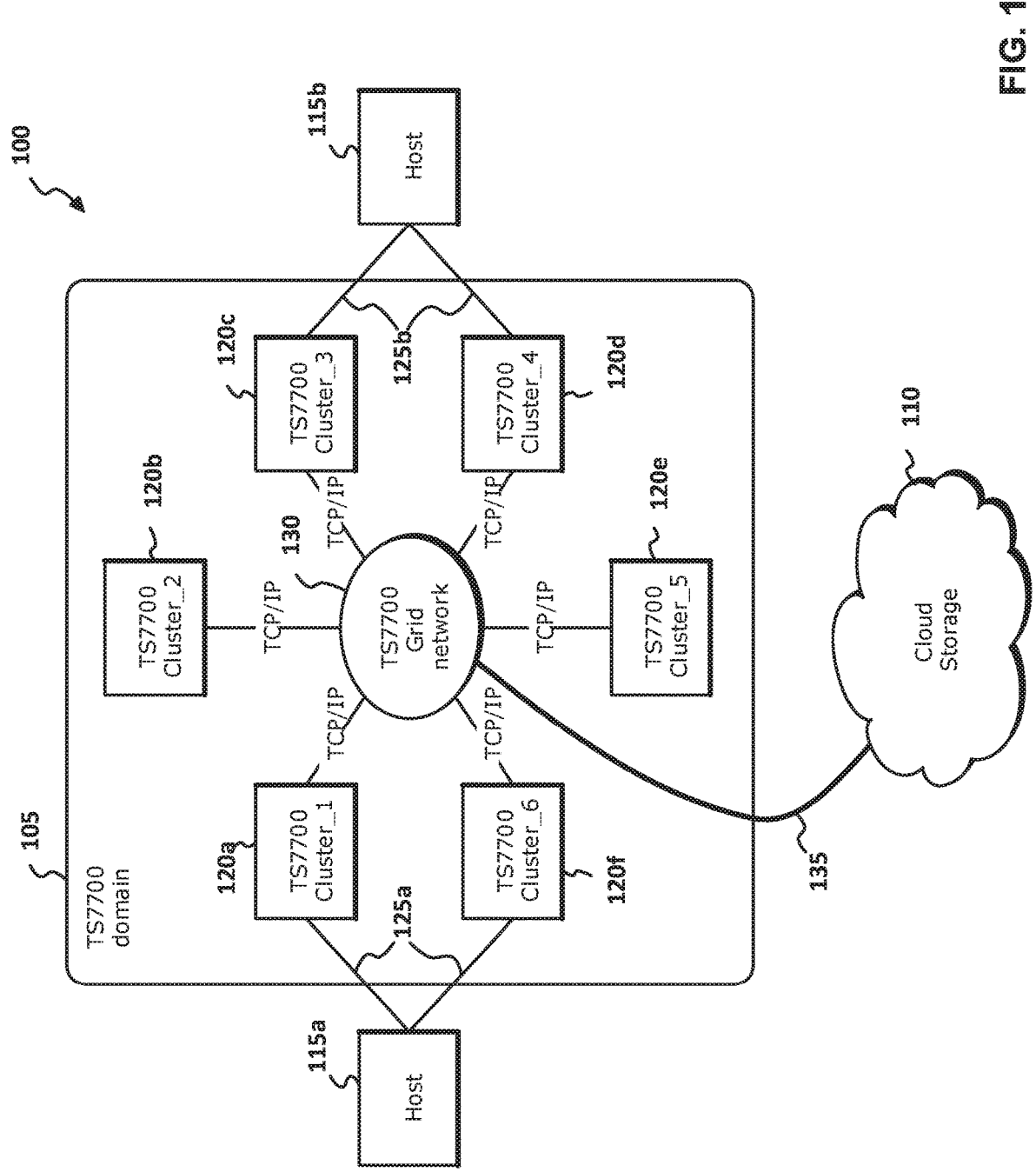
FIG. 1 illustrates a HSM system in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments, as defined by the appended claims and their equivalents. The terminology used herein was chosen to best explain the principles of the one or more embodiments, practical applications, or technical improvements over conventional technologies, or to enable those of ordinary skill in the art to understand the embodiments disclosed herein. As described, details of well-known features and techniques may be generalized or omitted to facilitate description or avoid unnecessarily obscuring the embodiments of the present invention.

Unless explicitly or otherwise defined herein, all terms are to be given their broadest reasonable interpretation including implied meanings, meanings as would be understood by those skilled in the art, or meanings as defined in dictionaries, treatises, or the like. Further, as used herein, the singular forms of "a," "an," "the," and the like also include the plural forms thereof, as appropriate or otherwise specified. Further, the terms "comprises" and/or "comprising," as used herein, specify the presence of stated features, integers, steps, operations, elements, and/or components, and do not preclude the presence or addition of one or more other features, integers, steps, operations, elements, components, and/or groups thereof.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

Various storage systems may implement HSM in an effort to reduce costs and improve performance, such as with respect to data integrity, redundancy, and the like. The upper layer of such systems may include expensive storage media such as in the form of SSDs, HDDs, and the like, to provide high data retrieval speed and availability. The lower layer may include inexpensive storage media such as in the form tape drives, and the like, to reduce costs.

As described in the specification hereinafter, the upper layer may be referred to as "primary storage," "primary storage tier," or the like. Further, the lower layer may be referred to as a "secondary storage," "secondary storage tier," or the like. It should be understood that such reference includes other types of devices in accordance with embodiments of the present invention, as may be appreciated by those of skill in the art. Furthermore, it should be understood that more than two storage tiers may be included in various embodiments of the present invention, and that such embodiments may be applicable to one or more of the various storage tiers, individually or in various combination.

In various embodiments of the present invention, the primary storage tier may include a "grid" configuration of storage devices and computing platforms that may be multiplexed and supported by way of one or more nodes. As described in the specification hereinafter, each node may be referred to as a "cluster." Further, a group of clusters arranged in a grid configuration may be referred to as a "domain."

In various embodiments of the present invention, the secondary storage may be, include, or otherwise implement cloud data storage (hereinafter, "cloud storage"). Generally, the cloud storage may include a cloud computing environment by which data storage functionality may be provided. The cloud computing environment may include, for example, virtual or logical computing resources that may be abstracted by way of a cloud layer, such that heterogeneous computing devices appear to be a single seamless pool of resources, such as a single memory pool, processing pool, or the like. The resources may include, for example, various types of physical or logical processing resources, data or memory resources, servers, networks, or storage devices, in accordance with embodiments of the present invention. In other words, the cloud storage may appear to be a single target, object, or entity, as observable or otherwise perceivable by, for example, a connected user computing platform, or the like.

In an embodiment of the present invention, a computing platform or device, such as a host computing platform that is connected to the HSM system may make, submit, or otherwise communicate a request to write data to at least one of the clusters of the primary storage tier. The request may include one or more write data instructions. In the embodiment, the request may include a stored data volume, data unit, or the like. In the embodiment, the stored data volume may be copied for storage on at least one of the clusters in the domain of the primary storage tier in accordance with one or more predefined copy policies. As described herein, it is assumed that the host writes the data by or in terms of data volume; however, embodiments of the present invention are not limited to any particular unit or type of data measure or metering. Accordingly, embodiments of the present invention may implement any type of data unit or measure such as fixed size data unit, variable size data unit, volume, file, block, object, segment, record, or the like.

In an embodiment of the present invention, a copy policy may be predefined by a user. In the embodiment, the copy policy may define, identify, designate, authorize, or otherwise specify a particular cluster of the HSM system that may store one or more copies of a data volume. Further, the copy policy may specify a particular period of time, such as in association with a corresponding condition or event, during which the particular cluster may store the copies. The copy of the volume may be associated with the user. Advantageously, this enables control over a number of copies of the volume that may be stored in the domain of the primary storage, by way of the copy policy, in turn enabling control over a level of redundancy as to the storage of the copies in the HSM system. In an example, a volume such as Volume-A may be stored in Cluster-2, Cluster-4 and Cluster-6, a volume such as Volume-B may be stored in Cluster-2 and Cluster-4, and a volume such as Volume-C may be stored only in Cluster-2, as specified in accordance with each respectively associated copy policy.

In various embodiment of the present invention, a data volume may be migrated to the cloud storage in the HSM system in accordance with a predefined migration algorithm. In the various embodiments, a target data volume stored in the primary storage may be copied (i.e., pre-migrated) to the secondary storage, and may later be removed (i.e., migrated) from the primary storage when, for example, a number of accesses of the target data volume, such as by a host computer, falls below a predetermined threshold for a certain period of time.

In the various embodiments, the target data volume may alternatively be delayed, and removed when, for example, such is necessary to secure free disk space in the primary storage tier for new write requests. After completion of migration operations for corresponding data volumes, the data volumes may be stored only in the secondary storage. Various migration algorithms may be used in the HSM system in accordance with embodiments of the present invention.

In the example described above, if Cluster-2 performs migration operations on Volume-A, Volume-B, and Volume-C, respectively, as well as in sequence, for transfer to the cloud storage, Cluster-4 and Cluster-6 may not perform copy operations on the volumes. In the example, such would result in a concentration of load (i.e., workload) on Cluster-2, as a result of its performance of the copy operations for each volume, thereby causing an increased amount of time required for completion. Accordingly, there is a need for optimized performance of such tasks as related to migration of data in such situations.

To achieve this, each cluster of the HSM system in accordance with embodiments of the present invention may utilize a hierarchical storage controller, for scheduling copy operations (i.e., pre-migration operations) with respect to data volumes, where each data volume may be stored in one or more clusters. Use of the controller enables distribution of loads among the clusters in the domain that result from performance of the copy operations. Accordingly, the copy operations may be performed according to the scheduling by the clusters of the first storage tier, to the cloud storage of the second storage tier. In the example described above, this allows for migration to the cloud storage of Volume-A from Cluster-6, Volume-B from Cluster-4, and Volume-C from Cluster-2. Later, each volume stored in the primary storage may be removed, as described above. As such, optimized performance of is achieved by efficient distribution of loads that result from performance of the copy operations, as well as from other related operations performed in the migration of data.

Embodiments of the present invention will now be described with reference to the accompanying Figures.

FIG. 1 illustrates an HSM system in accordance with an embodiment of the present invention. In the embodiment, host computers 115 are connected to the HSM system 100 via a network 125. The network 125 can be any type of data exchange or communication, including but not limited to a local area network (LAN) or a wide area network (WAN), SCSI (Small Computer System Interface), Fiber Channel, ESCON, FICON, USB (Universal Serial Bus). For example, the HSM system may be connected to a host computer via a FISCON communications channel. As depicted in FIG. 1, host computers such as host computers 115a and 115b may be connected to the HSM system via networks 125a and 125b, respectively. Each host computer 115 may be an individual and distinct computing device, such as a mainframe computer, a server computer, a laptop computer, a tablet computer, a notebook computer, a personal computer (PC), a desktop computer, a personal digital assistant (PDA), a smart phone, a thin client, or any other programmable electronic device capable of communicating with the HSM system 100 via network 125. Each host computer 115 may communicate requests to write data to and read data from the HSM system 100 in order to accomplish various data processing tasks. As described above, each host computer 115 may communicate requests to write and read the data in terms of volume. Each host computer 115 may include internal and external hardware components, such as depicted and described in detail with respect to FIG. 8.

In an embodiment of the present invention, the HSM system 100 may include a primary storage tier 105 and a second storage tier 110. Second storage tier 110 may otherwise be referred to as secondary storage 110 and cloud storage 110 in the present disclosure. In the embodiment, the primary storage tier 105 and the second storage tier 110 may represent, for example, an upper layer and a lower layer, respectively, of the HSM system 100. In the embodiment, the primary storage tier 105 may include a grid configuration in which storage devices and servers may be multiplexed by way of one or more storage nodes or clusters. A domain of the HSM system 100 may appear to be a single node to computing devices such as host computer 115. In the embodiment, the domain may utilize six storage clusters 120a-f, each interconnected by a grid network 5. In the embodiment, each cluster may be implemented by, for example, a IBM® TS7700 Virtual Tape System.

In an embodiment of the present invention, one or more of the clusters 120a-f may be connected to host computer 115 via the network 125 for communication of read/write requests, such as with respect to corresponding data volumes. For example, the clusters 120*a* (Cluster-1) and 120*f* (Cluster-6) may be connected to host 115*a* via network 125*a*, while the clusters 120*c* (Cluster-3) and 120*d* (Cluster-4) may be connected to host 115*b* via network 125*b*, as depicted in FIG. 1. Further, the clusters 120*a*-120*f* may be connected for communication in a grid configuration via a grid network 130.

The clusters 120*a*-120*f* may be connected to a second storage tier 110 via network 135 for communication, premigration, migration and/or recall of data volumes. The second storage tier 110 may be or otherwise include, for example, a cloud storage system. Similar to the domain of the HSM system 100, the second storage tier 110 may appear to be a single node to computing devices such as host computer 115. The second storage tier 110 may include, for example, storage subsystems, inter-connection fabric (fiber channel, InfiniBand, Ethernet, etc.), storage nodes, interface nodes, file system, and the like. The second storage tier 110 may be used in providing storage resources as part of a cloud storage service. The HSM system 100 may otherwise include other components and configurations in accordance with embodiments of the present invention.

Figure 2:
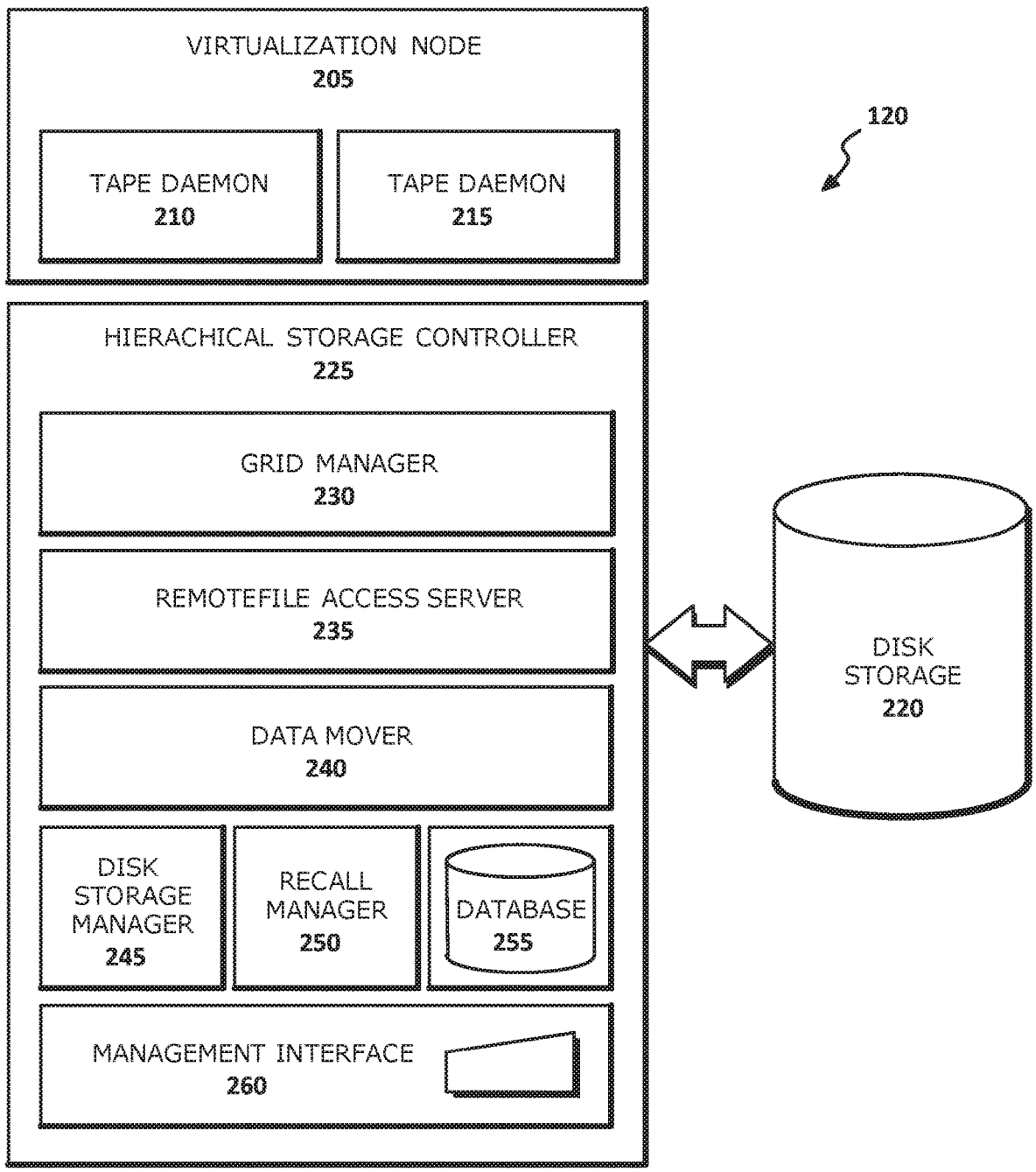
FIG. 2 illustrates a block diagram of a storage cluster 120 constituting the primary storage grid of the HSM system, in accordance with an embodiment of the present invention.

FIG. 2 illustrates a block diagram of a storage cluster 120 constituting the primary storage grid of the HSM system, in accordance with an embodiment of the present invention.

With reference to FIG. 2, the storage cluster 120 may include a virtualization node 205 and a disk storage 220 for emulation of a tape drive, a tape library, or the like. Each cluster 120 may include a hierarchical storage controller 225 for managing data movement or transfer between the disk storage 220 and the secondary storage 110, as well as for moving or copying data between the disk storage 220 and a disk storage of a remote storage cluster. The disk storage of the remote storage cluster may include, for example, one or more disk drives, such as a redundant array of independent disks (RAID), just a bunch of disks (JBOD), solid-state drives (SSD), and the like.

In an embodiment of the present invention, the disk storage 220 may function to provide a virtual volume cache containing logical volumes that may be emulated based on traditional tape volumes. The disk storage 220 may store the logical volumes for local and remote access. In the embodiment, the virtualization node 205 may include tape daemons such as tape daemons 210 and 215, for operation on virtual volume files as such may reside on the disk storage 220 or on a remote cache disk storage. The disk storage 220 may be, for example, a local cache disk storage. The virtualization node 205 may otherwise include any number of tape daemons for handling of virtual tape devices in parallel, such as in the IBM® TS7700 system, which may support up to 496 tape daemon instances at once.

As depicted in FIG. 2, the hierarchical storage controller 225 may include a grid manager 230, a remote file access server 235, a data mover 240, a disk storage manager 245, a recall manager 250, a database 255, and a management interface 260.

The grid manager 230 may function to coordinate operations between clusters 120 based on data stored in the database 255 of each cluster 120, to determine which cluster 120 stores, includes, or otherwise possesses a current copy of all data volumes in the domain at a particular point in time. The grid manager 230 may further function to coordinate copying of data between clusters in accordance with one or more copy policies, which may be stored, for example, in the database 255 of each cluster. The remote file access server 235 may function to provide a link to a cache of disk storage 220, such as of a remote cluster. The data mover 240 may function to control data transfer operations for copies performed between clusters 120, as well as transfers of data volumes between disk storage 220 and the secondary storage 110.

Disk storage manager 245 may function to control copying of data volumes between disk storage 220 and the secondary storage 110, and may further control subsequent removal of a redundant copy of data in the disk storage 220. Disk storage manager 245 may further function to communicate control signals for balancing load and data flow between the disk storage 220 and other components of the database 255. Recall manager 250 may function to queue and control recall of data with respect to the disk storage 220 and the secondary storage 110 on behalf of virtualization node 205 and grid manager 230.

The database 255 may function to store data used in identifying one or more clusters that store one or more copies of a data volume, with respect to all data volumes in the domain of the primary storage tier 105. The database 255 may further function to store data used in identifying one or more clusters that store copy policies corresponding to each of the data volumes. Each copy policy may be associated with a unique identifier. The management interface 260 may function to provide information regarding each storage cluster 120 to enable user control and configuration thereof.

The storage cluster 120 may be, for example, the IBM® TS7700 system which may be implemented to provide virtual tape storage functionality in various types of HSM systems. Different types of storage systems may otherwise be implemented in accordance with embodiments of the present invention.

Figure 3:
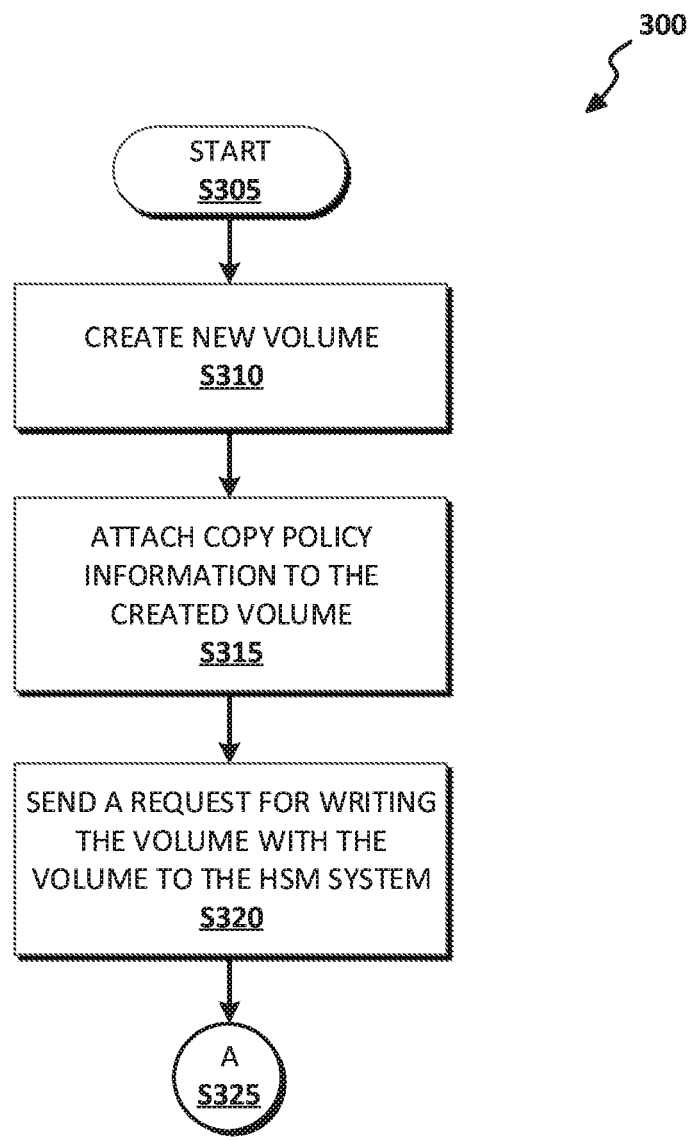
FIG. 3 illustrates a flowchart representing the operations for setting a copy policy for a data volume to be stored in the HSM system, in accordance an embodiment of the present invention.

FIG. 3 illustrates a flowchart 300 representing the operations for setting a copy policy for a data volume to be stored in the HSM system, in accordance with an embodiment of the present invention.

At step S305, the process is started.

At step S310, a new data volume may be created at a host computer such as one of the host computers 115.

At step S315, copy policy data may be attached to the data volume. In an embodiment of the present invention, the copy policy data may be or otherwise include an identifier associated with a copy policy, as such may be stored in the database 255 of a storage cluster 120. Attachment of the copy policy data may include performing associated archiving operations, such as by a computer program that may determine whether the data volume satisfies a predefined condition with respect to the associated copy policy. The archiving operations may otherwise be performed by a user. The predefined condition may relate to one or more attributes associated with individual data volumes and may include, for example, a type of file of the data volume (e.g., movie file, image file, text file, application file, etc.), a label attached to the data volume such as with respect to a classification or level of importance, size, author/creator, security level, volume name, content, meta tags, attached comment, version, creation time, modification time, or the like.

At step S320, the host computer 115 may then send a write request corresponding to the created data volume, along with the volume data itself, to the HSM system 100 via network 125.

At step S325, the process is continued by one or more of the storage clusters 120 of the HSM system 100.

Figure 6A:
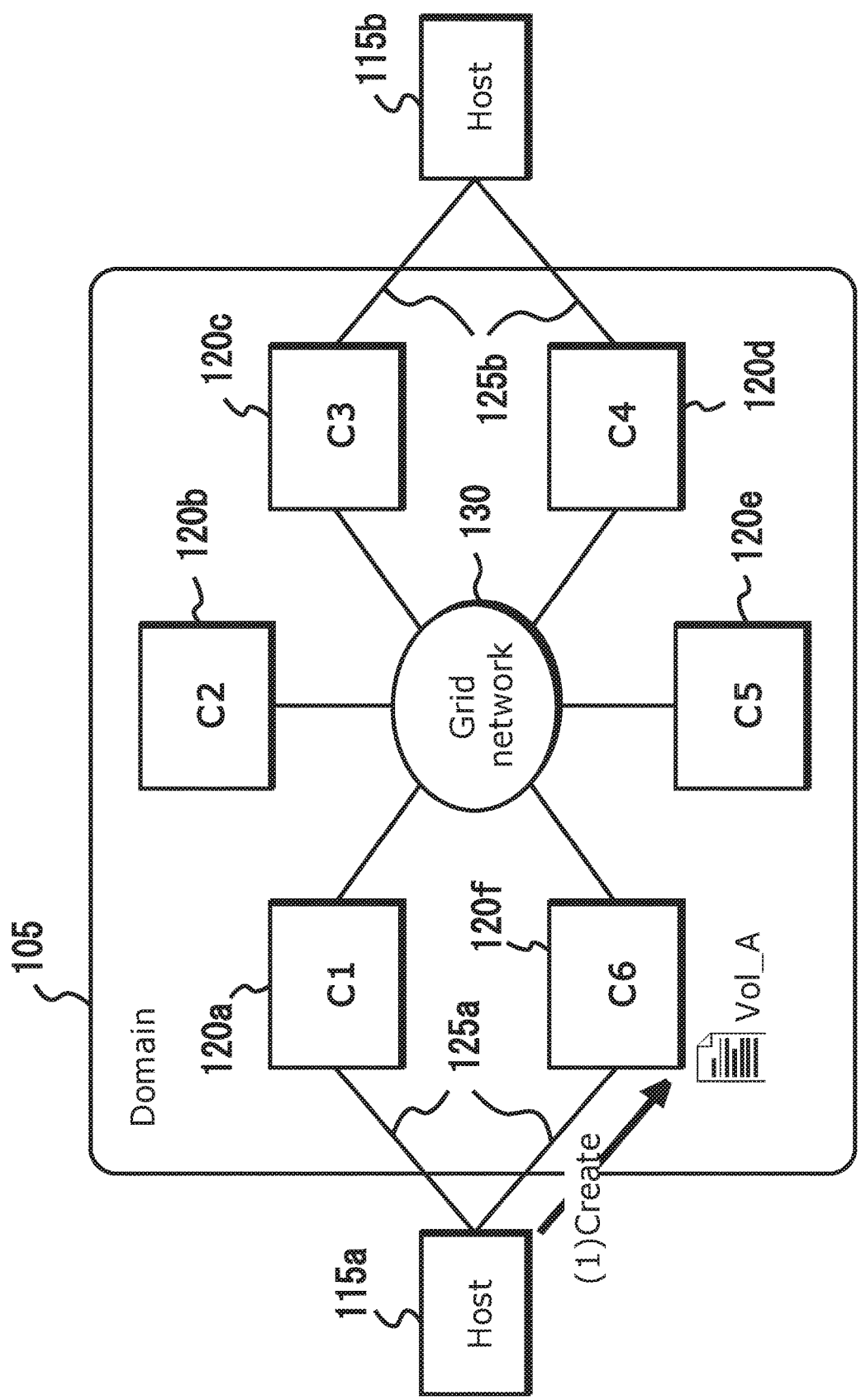
FIGS. 6A and 6B illustrates a diagram for describing the operation of storing and copying the data volume in the primary storage tier in response to receiving a write request from the host computer connected to the HSM system, in accordance with an embodiment of the present invention.

In an embodiment of the present invention, the host computer 115*a* may send a write request in association with Volume-A to Cluster-6 (120*f*), as depicted in FIG. 6A. FIG. 6A illustrates a diagram for describing the operation of storing the data volume in the primary storage tier in response to receiving a write request from the host computer connected to the HSM system, in accordance with embodiments of the present invention.

Figure 4:
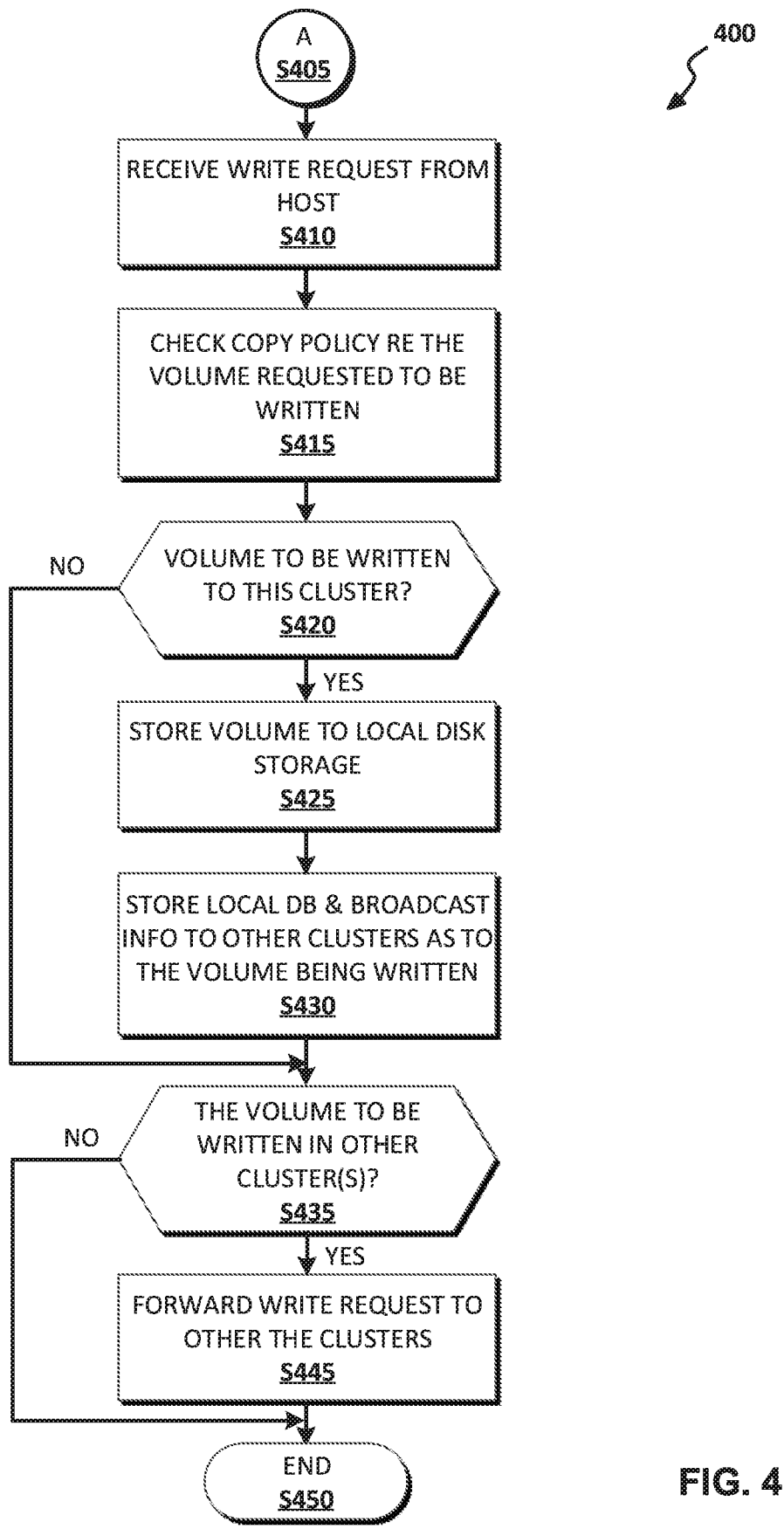
FIG. 4 illustrates a flowchart representing the operations of storing and copying the data volume in the primary storage tier in response to receiving a write request from the host computer 115 connected to the HSM system, in accordance with an embodiment of the present invention.

FIG. 4 illustrates a flowchart representing the operations associated with storing and copying the data volume in the primary storage tier in response to receiving a write request from the host computer 115, in accordance with embodiments of the present invention.

At step S405, the process 400 starts. At step S410, one of the storage clusters 120 in the domain 115 receives the write request including the corresponding data volume, as was sent from the host computer 115. The write request may be received by a storage cluster such as Cluster-6 120f, as depicted in FIG. 6A. At step S415, the storage cluster 120 checks a copy policy relating to the data volume corresponding to the received write request. The copy policy is identified from copy policies stored in database 255 by using a copy policy identifier attached to the data volume. At step S420, a determination as to whether the data volume is to be written in this cluster is made if a copy policy corresponding to the write request is identified. Where a corresponding copy policy is identified, the process proceeds to step S425. Where a corresponding copy policy is not identified, the process proceeds to step S435. At step S425, the data volume is stored in the local disk storage 220 of the storage cluster in accordance with the identified copy policy. At step S430, information indicating that the data volume has been written in the storage cluster is stored in the local disk storage 220, and is recorded in the local database 255. The information is also sent or broadcast to all other storage clusters 120 in the domain of the primary storage tier 105 for updating databases of each of the clusters, accordingly. At step 435, a determination may be made as to whether the volume is to be written in one or more of the other clusters in the domain of the primary storage tier 105. In an embodiment of the present invention, the determination may be made based on the copy policy identified at step S415, as applicable to the data volume, as well as on information indicative of which cluster in the domain of the primary storage tier 105 currently stores a copy of the data volume, which may be stored in the database 255 of each cluster. At step S445, the write request is forwarded according to the determinations made at step 435. At step S450, the process ends.

In an embodiment of the present invention, a copy policy may be or otherwise include instructions representative of immediate copy, deferred copy, time-delayed copy, or synchronous copy. If the copy policy is immediate copy, the volume is determined to be written in other storage cluster(s) when the volume is closed in the current storage cluster that received the write request. If the copy policy is deferred copy, the volume is determined to be written in other storage cluster(s) when a certain period of time has passed after the volume is closed in the current storage cluster. If the copy policy is time-delayed copy, the volume is determined to be written in other storage cluster(s) when the time which is automatically specified by a program or specified by a user has come. If the copy policy is synchronous copy, the volume is determined to be written in other storage cluster(s) before the volume is closed in the current storage cluster so that the volume is written concurrently in the current storage cluster and the other storage cluster(s).

Figure 6B:
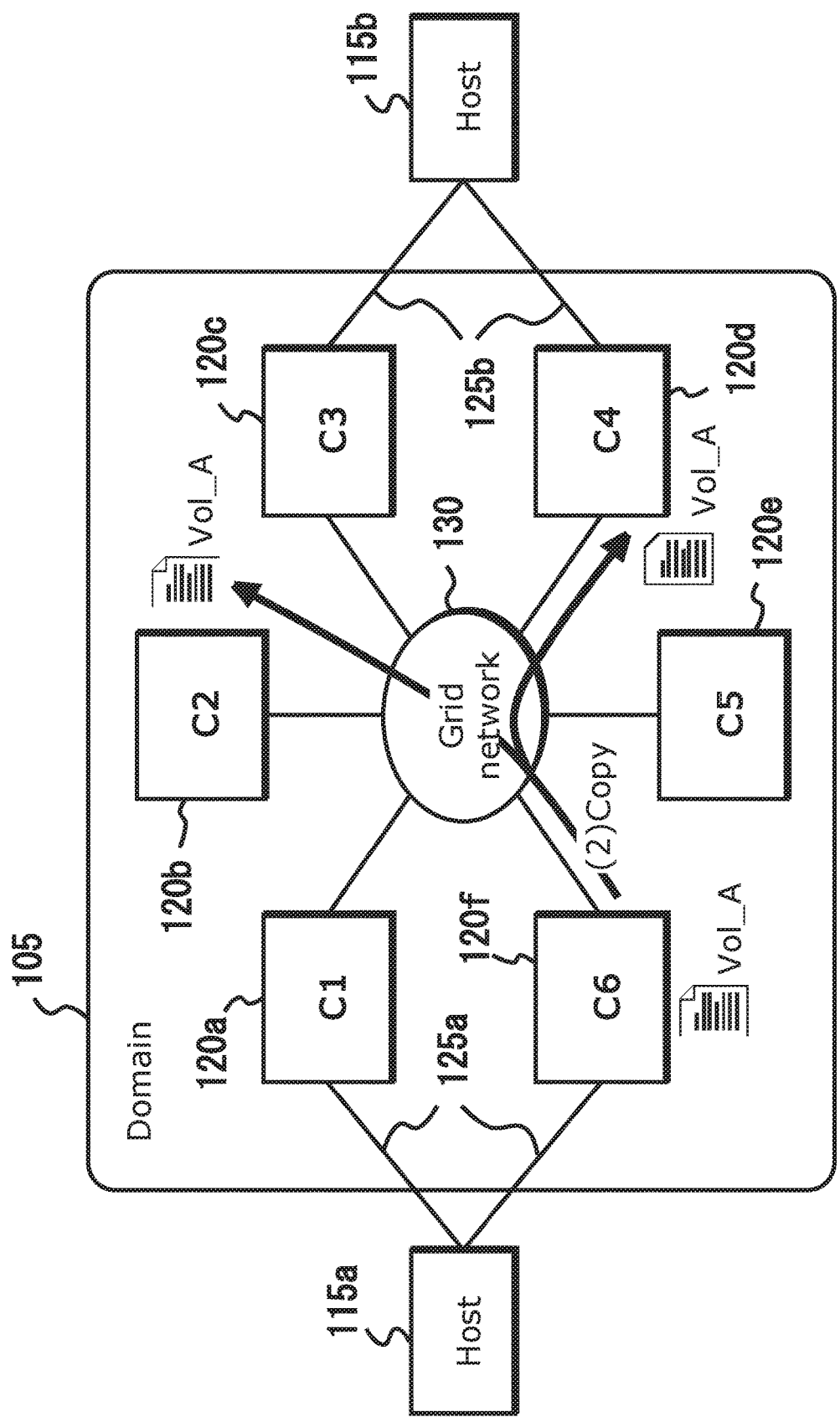

In an embodiment of the present invention, Volume-A stored in Cluster-6 (120f) is copied to Cluster-2 (120b) and Cluster-4 (120d) according to the copy policy identified, as shown in FIG. 6B. FIG. 6B illustrates a diagram for describing the operation of copying the data volume in the primary storage tier in response to receiving a write request from the host computer connected to the HSM system, in accordance with embodiments of the present invention.

Figure 5:
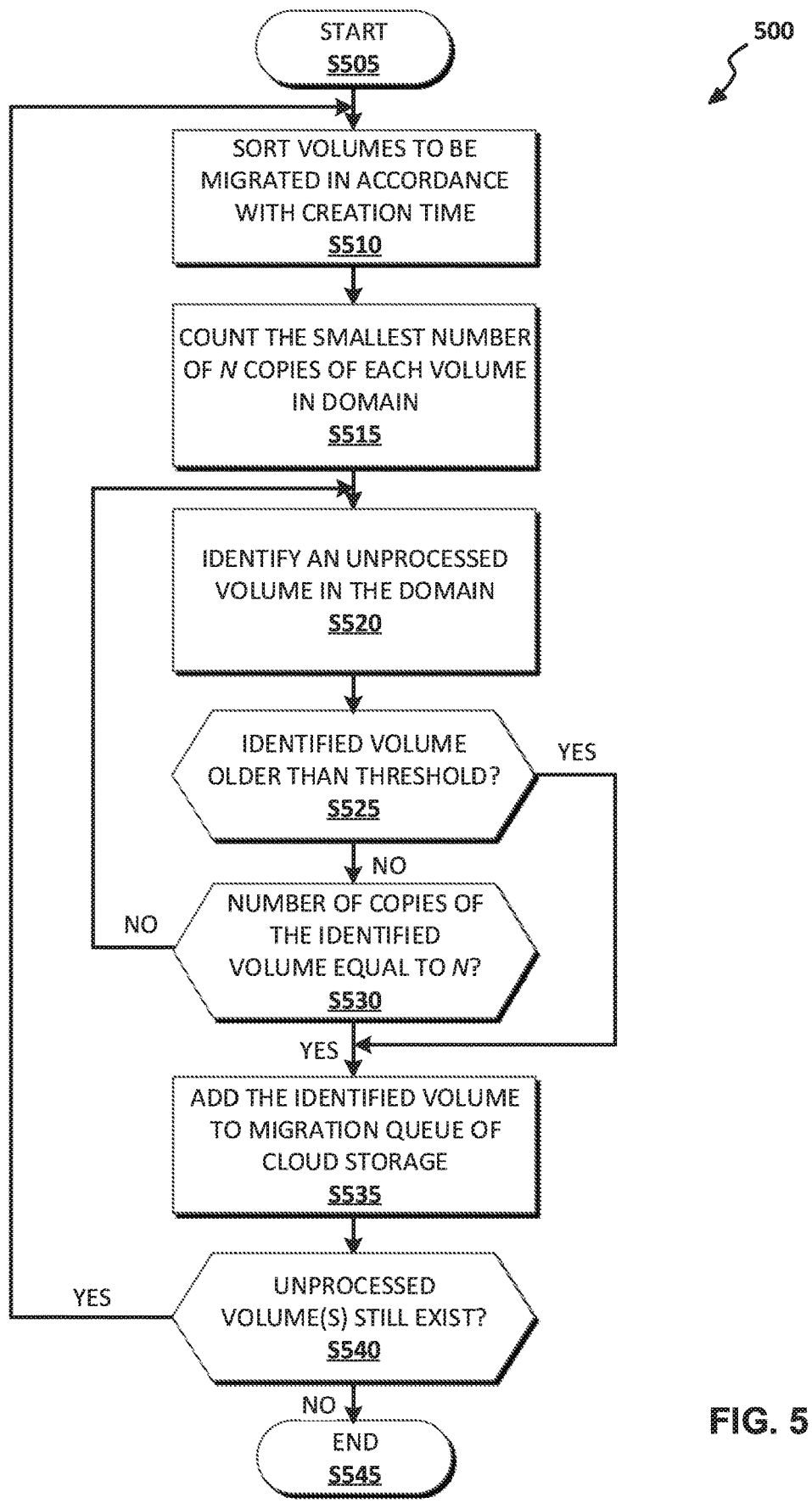
FIG. 5 illustrates a flowchart representing the copy operations for the data file stored in the plurality of clusters in the primary storage layer to the cloud storage in the HSM system in accordance with an embodiment of the present invention.

FIG. 5 illustrates a flowchart representing the migration operations for the data file stored in the plurality of clusters in the primary storage layer to the cloud storage in the HSM system, in accordance with embodiments of the present invention. The migration operations may be performed as part of data volume migration process 500.

At step S505, the data volume migration process 500 starts. In various embodiments of the present invention, the process 500 may be triggered at regular intervals, or in response to an occurrence of a certain event or condition. For example, the process 500 may be triggered when the amount of free space of disk storage of one of storage clusters 120 becomes less than a predefined threshold.

At step S510, each respective storage cluster then sorts locally stored data volumes in accordance with the creation time, last access time, or other attribute(s) as such may be associated with each data volume. The data volumes may be stored in the local disk storage 220 of each respective storage cluster at the time of sorting, and may include those determined to be migrated to the secondary storage 110. A data volume may be determined to be migrated to the cloud storage 110 if it is not used or accessed for a certain period of time.

At step S515, each cluster counts the smallest number ("N") of copies in the domain of the primary storage tier 105 for each data volume stored in each respective cluster. Each cluster may count the number of copies based on the broadcasted data for determining which cluster has or stores a current copy of each respective data volume in the domain of the primary storage tier 105, as previously described.

At step S520, each cluster identifies one or more of the data volumes in the domain that has not yet been processed (S520).

At step S525, each cluster determines, for each identified data volume as in step S520, whether the volume is older than a predetermined threshold. In an embodiment of the present invention, where the determination at step S525 produces a true or "YES" result, then the process proceeds to step 535, whereby the identified data volume may be added to a migration queue of the secondary storage 110. Advantageously, steps S525 and S535 serve as a "safety-net" for situations where, for example, another cluster storing a copy of the identified data volume fails to migrate the volume due to a localized error affecting the other cluster. In the embodiment, where the determination at step S525 produces a false or "NO" result, the process proceeds instead to step S530, whereby the storage cluster 120 determines whether the number of copies of the identified data volume is equal to "N". Where the determination at step S530 produces a true or "YES" result, the data volume may be added to the migration queue of the secondary storage 110, for scheduling of an associated migration operation. Where the determination at step S530 produces a false or "NO" result, the process proceeds back to step S520 to repeat the process for another, unprocessed data volume.

At step S540, it is respectively determined by each storage cluster whether there are still any unprocessed data volume(s) remaining. In an embodiment of the present invention, where the determination produces a true or "YES" result, the process proceeds back to step S510 to process the unprocessed data volume(s), accordingly. where the determination produces a false or "NO" result, the process ends at step S545. It should be noted that the volumes which are copied during process 500 are to be removed from the primary storage if a host computer connected to the HSM system does not use them for a certain period of time after the copy operations (not shown in the FIG. 5).

Figure 7:
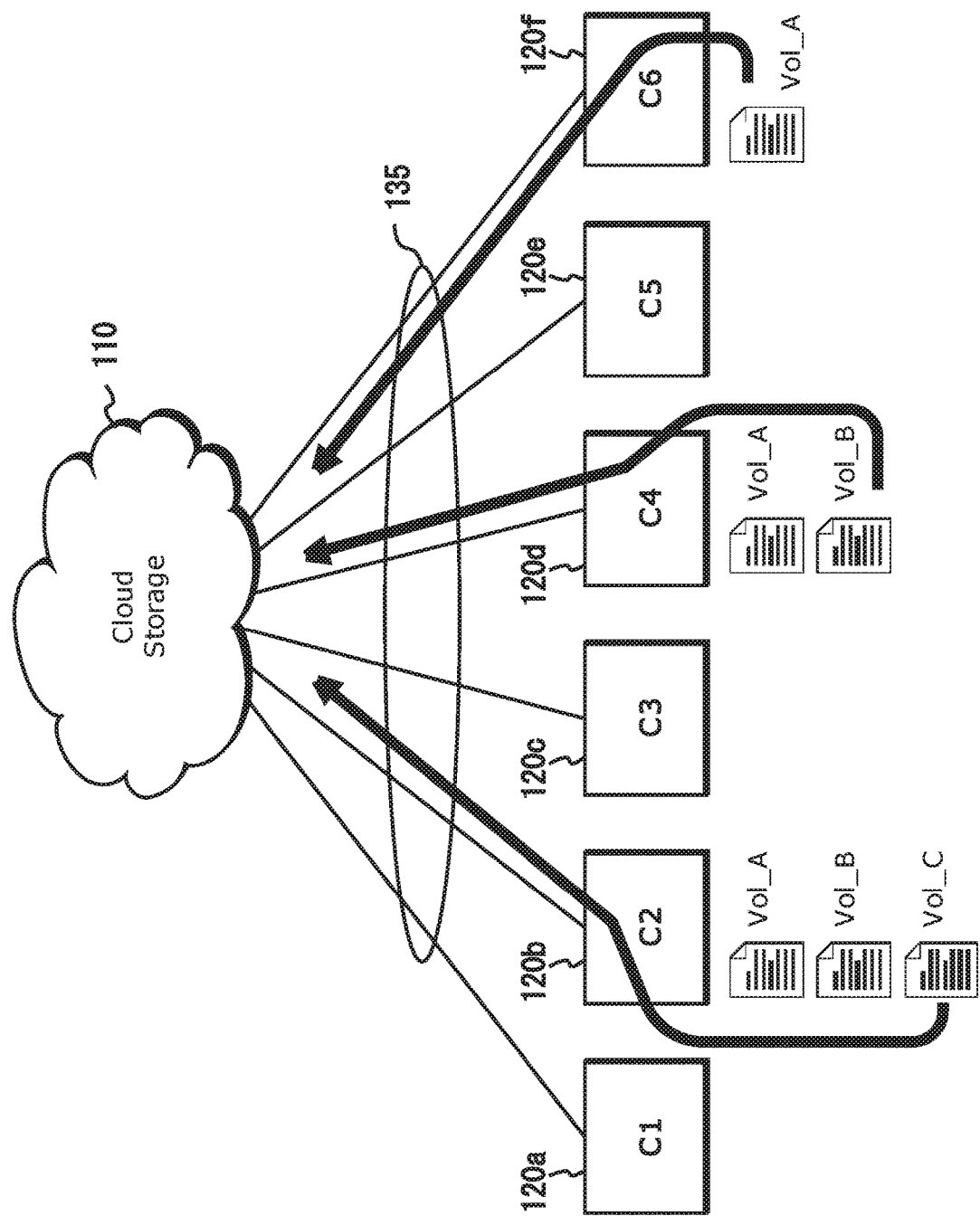
FIG. 7 illustrates a diagram for describing the copy operations for the data file stored in the plurality of clusters in the primary storage layer, to the cloud storage in the HSM system, in accordance with an embodiment of the present invention.

An example copy operation in accordance with an embodiment of the present invention will now be described with reference to the FIG. 7. FIG. 7 illustrates a diagram for describing the migration operations for the data volumes stored in the plurality of clusters in the primary storage layer or tier, to the cloud storage in the HSM system, in accordance with an embodiment of the present invention.

To note, the example is based on a previous example of the present disclosure, where there are six (6) storage clusters 120a-120f in the domain of the primary storage tier 105, and Cluster-2 (120b) stores Volume-A, Volume-B, and Volume-C, Cluster-4 stores Volume-A and Volume-B, and Cluster-6 stores only Volume-A, and further, where the data volumes are determined and selected to be migrated to the cloud storage 110, such as may be due to a lack of user requested access to each of the respective volumes for a certain period of time. Additionally, it is also assumed in the following example that Volume-A has a least oldest (i.e., newest) creation time, Volume-B has a second oldest creation time, and Volume-C has an oldest creation time, relative to that of Volume-A and Volume-B. Therefore, in this example, Cluster-6 (120f) sorts Volume-C, Volume-B, and then Volume-A, and further, Cluster-4 (120d) sorts Volume-B and Volume-A, where each set of volumes is sorted by each respective cluster in the aforementioned orders, such as in at step S510. Cluster-2 performs no such sorting operation since it has only Volume-A.

In the example, this results in three copies of Volume-A, two copies of Volume-B, and one copy for Volume-C in the domain of the primary storage tier 105. Therefore, at step S515, storage Cluster-2 recognizes that the smallest one of numbers "N" of the copies of the volumes stored in the Cluster-2 is one, since it has "N" for Volume-A is "3", "N" for Volume-B is "2" and "N" for Volume-C is "1". Similarly, at step S515, storage Cluster-4 recognizes that the smallest one of the numbers "N" of the copies of the volumes is two, and Cluster-6 recognizes that the smallest one of the numbers "N" of the copies of the volumes is three.

In the example, at steps S520 through S535, Cluster-2 adds Volume-C to its migration queue since the number of copies of Volume-C in the domain of the primary storage tier 105 is equal to the smallest number recognized by Cluster-2 (i.e. one (1)). Cluster-4 adds Volume-B to its migration queue since the number of copies of Volume-B in the domain of the primary storage tier 105 is equal to the smallest number recognized by Cluster-4 (i.e. two (2)). Finally, Cluster-6 adds Volume-A to its migration queue since the number of copies of Volume-A in the domain of the primary storage tier 105 is equal to the smallest number recognized by Cluster-6 (i.e. three (3)).

In the example, Volume-A is copied from Cluster-6, Volume-B is copied from Cluster-4 and Volume-C is copied from Cluster-2 to the secondary storage 110 (i.e., the cloud storage). As a result of implementation of the embodiments of the present invention, the loads resulting from migration operations are efficiently distributed among the storage clusters in the domain, and migration performance is maximized. Again, it should be noted that in one embodiment Volume-A, B and C are to be removed from the primary storage if a host computer connected to the HSM system does not use them for a certain period of time after the copy operations.

In various embodiments of the present invention, as described above, it may be assumed that the secondary storage is a single target in the cloud. In other embodiments of the present invention, the secondary storage may provide a cloud service having two or more cloud storage nodes, each of which may be a single target having a unique uniform resource locator (URL). In such embodiments, for example, the storage cloud nodes may be established in Japan and in the US respectively and a vendor of the cloud service may be responsible for replication of the data among the storage cloud nodes. In such a multiple cloud storage nodes scenario, once a volume is written in one of the storage cloud nodes, the cloud service may copy it to the others of the storage cloud nodes of the cloud service. If the secondary storage involves multiple cloud services, the storage clusters of the primary storage may copy the volumes to be migrated to the secondary storage of each cloud service.

Figure 8:
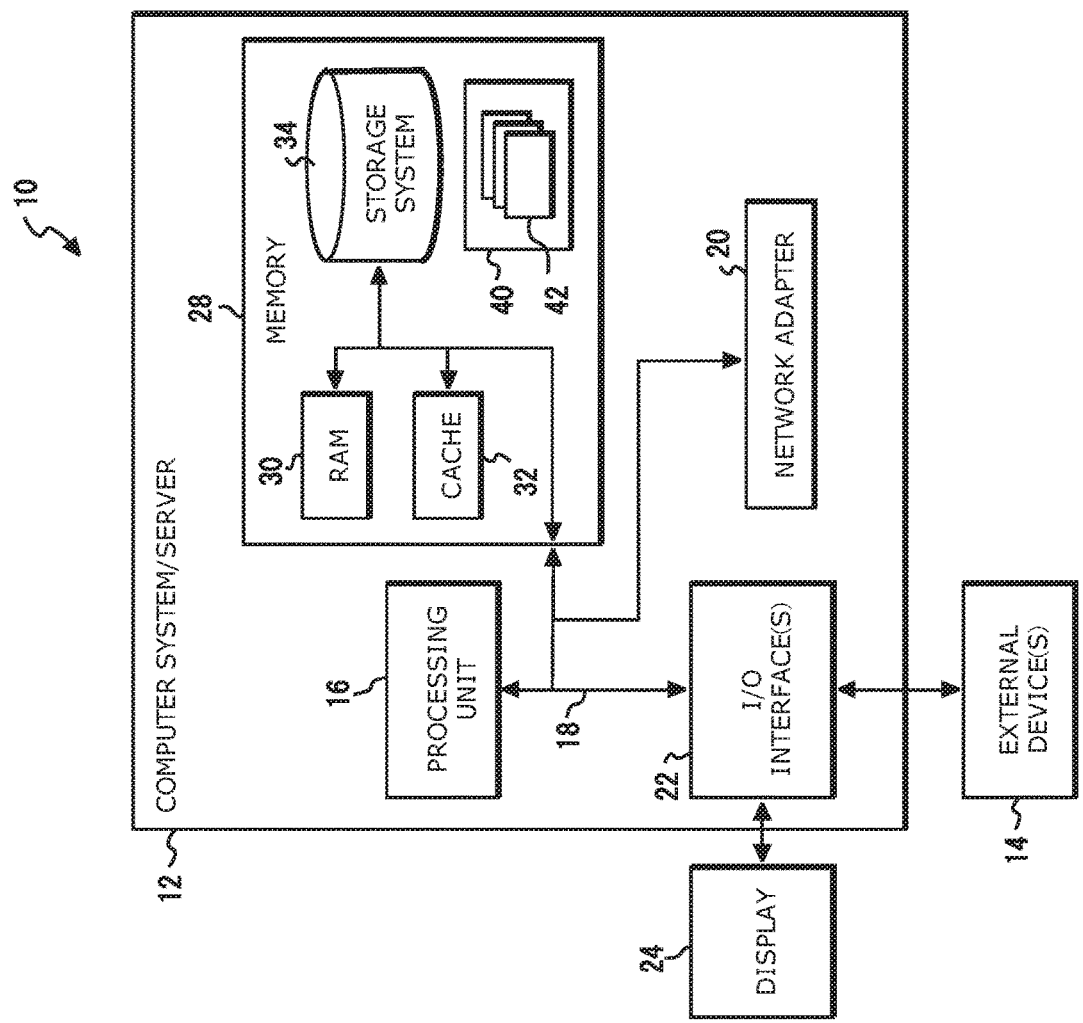
FIG. 8 illustrates a diagram showing an example of a preferred hardware configuration of a data processing device, as may be embodied by the host computer, the storage cluster, and/or a computing platform, in accordance with an embodiment of the present invention.

FIG. 8 illustrates a diagram showing an example of a preferred hardware configuration of a data processing device 10, as may be embodied by the host computer 115, the storage cluster 120, and/or a computing platform such as the second storage tier 110, in accordance with an embodiment of the present invention. The data processing device 10 may be, for example, a computing platform such as a general-purpose computing device, a server, or any other type of computing platform as described with reference to FIG. 1. As shown in FIG. 8, the data processing device 10 may be, include, or otherwise be supported by, for example, computer system/server 12. The components of computer system/server 12 may include, for example, one or more processors or processing units 16, a system memory 28, and a bus 18 for coupling various system components including system memory 28 to processor 16.

Bus 18 represents any type of bus structure or device, such as including a memory bus, a memory controller, a peripheral bus, an accelerated graphics port, a processor or local bus using any of a variety of bus architectures, or the like. For example, the bus structure may be or include an industry standard architecture (ISA) bus, a micro-channel architecture (MCA) bus, an enhanced ISA (EISA) bus, a video electronics standards association (VESA) local bus, a peripheral component interconnects (PCI) bus, or the like.

Computer system/server 12 may generally include, for example, a variety of computer system readable media. Such media may be any available type of media that is accessible by computer system/server 12, and may include, for example, volatile and non-volatile media as well as removable and non-removable media.

System memory 28 may include volatile computer system readable media such as random access memory (RAM) 30 and/or cache memory 32. Computer system/server 12 may further include other removable/non-removable and volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each may be connected to bus 18 by one or more data media interfaces. As further depicted and described below, memory 28 may include at least one program product having a set (i.e., at least one set) of program modules or instructions for execution that may be configured to carry out various functions of the present invention, as described herein.

The computer readable medium may be a computer readable signal medium or a computer readable storage medium. The computer readable storage medium may be, for example, an electronic, magnetic, electromagnetic, optical, infrared, or semiconductor system, apparatus, or device, or any suitable combination thereof. For example, the computer readable storage medium may be or include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of the present invention, the computer readable storage medium may be any tangible medium that may contain or store a program for use by or in connection with an instruction execution system, apparatus, or device.

A computer readable signal medium may include a propagated data signal with computer readable program code embodied therein (e.g., in baseband or as part of a carrier wave). Such a propagated signal may take various forms, such as electro-magnetic, optical, any suitable combination thereof, or the like. A computer readable signal medium may be any computer readable medium that is not a computer readable storage medium, that may be used to communicate, propagate, or transport a program or program instructions for use or execution by or in connection with an instruction execution system, apparatus, or device.

Program code embodied on a computer readable medium may be transmitted using any appropriate medium including, for example, wireless, wireline, optical fiber cable, radio-frequency (RF), etc., or any suitable combination thereof.

Program/utility 40, having a set (i.e., at least one set) of program modules 42, may be stored in memory 28 such as by way of, for example, an operating system, one or more application programs, program modules, or any other form of program data, and may be used in an implementation of a networking environment, either individually or in various combination. Generally, program modules 42 may be used in carrying out the various functions or methodologies of the present invention as described herein.

Computer system/server 12 may communicate with display 24 and/or one or more external devices 14, such as a keyboard, a pointing device, and/or any other type of user interface or input/output (I/O) device. Display 24 may be used, for example, to provide an interface or mechanism for displaying data or information to a user, and may be, for example, a display, a monitor, a television screen, or the like.

Generally, computer system/server 12 may communicate with any type of device used in enabling user interaction therewith. Further, computer system/server 12 may communicate with any type of device, such as including a network card, a modem, or the like, that may be used in enabling communication between computer system/server 12 one or more other computing devices or platforms. Such communication may occur, for example, by way of I/O interface(s) 22. Further, computer system/server 12 may communicate, such as by way of network adapter 20, with one or more networks such as a local area network (LAN), a general wide area network (WAN), a public network (e.g., the Internet), or the like. As depicted in FIG. 8, network adapter 20 may communicate with the other components of computer system/server 12 by way of bus 18. It should be understood that, although not shown, other hardware and/or software components may be used by or in conjunction with computer system/server 12. Such hardware and/or software components may include, for example, one or more microcodes, device drivers, redundant processing units, external disk drive arrays, RAID systems, tape drives, data archival storage systems, and so on.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
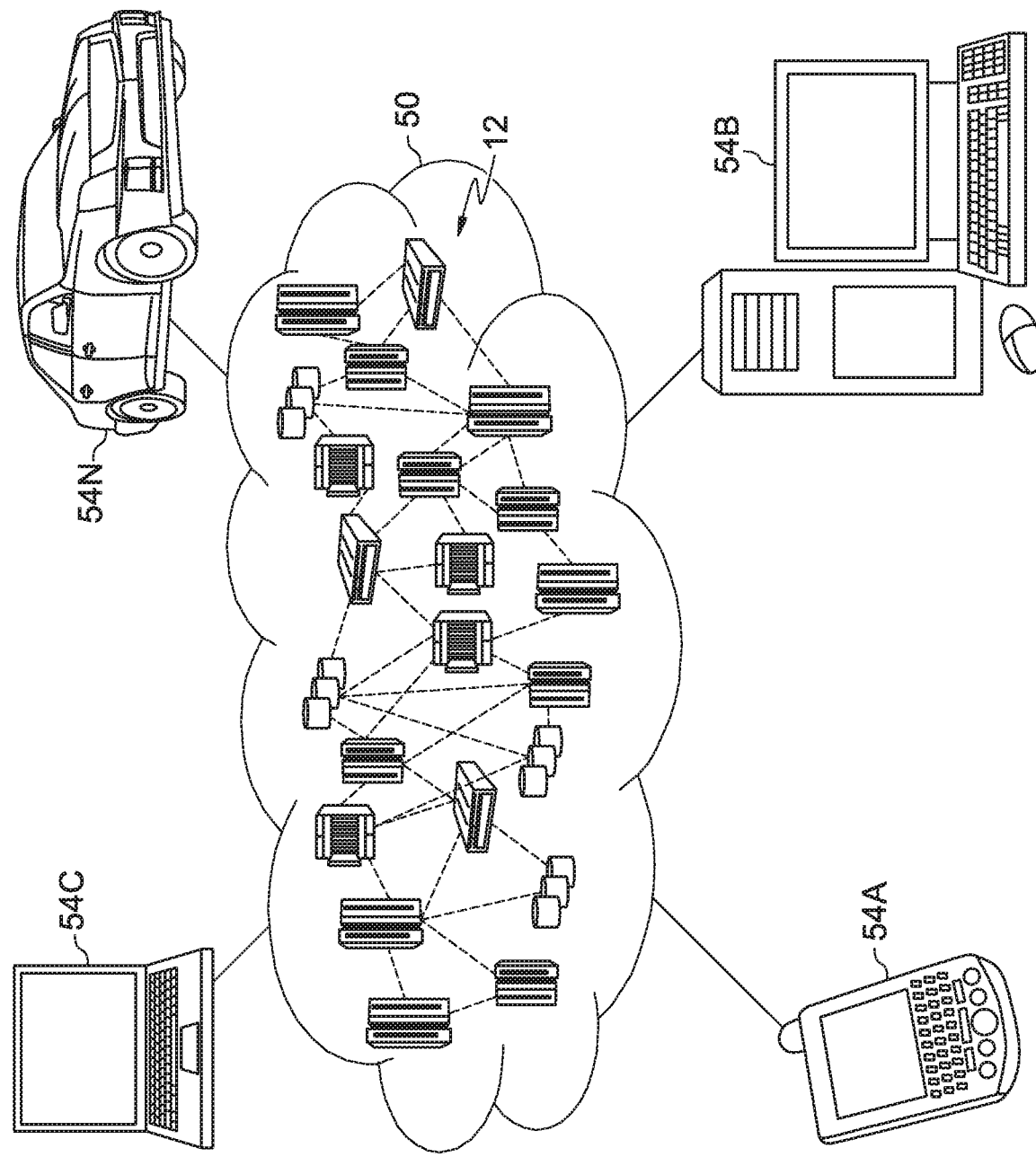
FIG. 9 illustrates a cloud computing environment according to embodiments of the present invention.

Referring now to FIG. 9, illustrative cloud computing environment 50 is depicted. As shown, cloud computing environment 50 includes one or more cloud computing nodes 12 with which local computing devices used by cloud consumers, such as, for example, personal digital assistant (PDA) or cellular telephone 54A, desktop computer 54B, laptop computer 54C, and/or automobile computer system 54N may communicate. Nodes 12 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 12 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hierarchical storage management 96. Hierarchical storage management 96 may include functionality enabling the cloud computing environment to be used in data migration management in a hierarchical storage management system, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method of managing copy operations on data units in a hierarchical storage management system, the management system comprising an upper layer and a lower layer, wherein the upper layer comprises a domain in which storage nodes are arranged for communication in a multiplexed grid configuration, wherein each data unit is stored in one or more of the storage nodes, the method comprising:

determining, an N value for each data unit that represents a total number of copies of the data unit stored in the domain, wherein the determination is made based on data received over the multiplexed grid from one or more of the storage nodes respectively storing the copies;

scheduling copy operations with respect to each data unit based on comparison of the determined N value, wherein the scheduling copy operations comprises selecting a data unit from the nodes where the data unit have the determined N value less than any other N values before selecting another data unit from another node; and performing the copy operations in accordance with the scheduling with respect to each data unit for respective migration of each data unit to the lower layer.

2. The method according to claim 1, further comprising:

receiving, from a computing device connected to the management system, a write request corresponding to a data unit stored in one or more of the storage nodes, the data unit comprising an associated copy policy specifying one or more authorized storage nodes in which a copy of the data unit can be stored, wherein the copy policy further specifies a period of time during which the copy can be stored in the one or more authorized storage nodes; and executing the write request to perform a corresponding write operation on the data unit in accordance with the copy policy and with respect to the one or more authorized storage nodes.

3. The method according to claim 1, wherein performing the copy operations in accordance with the scheduling with respect to each data unit comprises limiting a number of times each data unit is copied from a respectively corresponding storage node to one.

4. The method according to claim 1, wherein the lower layer comprises storage nodes that each have a data retrieval speed and a level of availability lower than that of any of the one or more storage nodes in the upper layer.

5. The method according to claim 1, wherein the lower layer comprises virtualized memory resources that are abstracted to provide a memory pool.

6. The method according to claim 5, wherein the virtualized memory resources are abstracted by a cloud computing layer.

7. The method according to claim 1, wherein each storage node comprises a database connected to the multiplexed grid for communication with individual databases of each of the storage nodes for identifying one or more of the storage nodes in which a corresponding data unit is stored.

8. The method according to claim 1, wherein scheduling the copy operations comprises:

selecting, by a storage node in the domain, one or more of the storage nodes in the domain for the performance of the copy operations with respect to a corresponding data unit to be copied, wherein the storage nodes are selected based on a determination that a copy of the data unit to be copied is stored in one or more of the storage nodes, wherein a copy operation has not been performed on the data unit for an amount of time exceeding a predetermined threshold.

9. The method according to claim 1, wherein scheduling the copy operations comprises:

selecting, by a storage node in the domain, one or more of the storage nodes in the domain for the performance of the copy operations with respect to a corresponding data unit to be copied, wherein the storage nodes are selected based on a determination that the storage node itself stores a copy of the data unit to be copied, wherein a number of copies of the data unit stored in the storage node itself is less than that stored in any of the other storage nodes in the domain.

10. A computer system for managing copy operations on data units in a hierarchical storage management system, the management system comprising an upper layer and a lower layer, wherein the upper layer comprises a domain in which storage nodes are arranged for communication in a multiplexed grid configuration, wherein each data unit is stored in one or more of the storage nodes, the computer system comprising:

one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:

determining, an N value for each data unit that represents a total number of copies of the data unit stored in the domain, wherein the determination is made based on data received over the multiplexed grid from one or more of the storage nodes respectively storing the copies;

scheduling copy operations with respect to each data unit based on comparison of the determined N value, wherein the scheduling copy operations comprises selecting a data unit from the nodes where the data unit have the determined N value less than any other N values before selecting another data unit from another node; and performing the copy operations in accordance with the scheduling with respect to each data unit for respective migration of each data unit to the lower layer.

11. The computer system according to claim 10, the method further comprising:

receiving, from a computing device connected to the management system, a write request corresponding to a data unit stored in one or more of the storage nodes, the data unit comprising an associated copy policy specifying one or more authorized storage nodes in which a copy of the data unit can be stored, wherein the copy policy further specifies a period of time during which the copy can be stored in the one or more authorized storage nodes; and executing the write request to perform a corresponding write operation on the data unit in accordance with the copy policy and with respect to the one or more authorized storage nodes.

12. The computer system according to claim 10, wherein performing the copy operations in accordance with the scheduling with respect to each data unit comprises limiting a number of times each data unit is copied from a respectively corresponding storage node to one.

13. The computer system according to claim 10, wherein the lower layer comprises storage nodes that each have a data retrieval speed and a level of availability lower than that of any of the one or more storage nodes in the upper layer.

14. The computer system according to claim 10, wherein the lower layer comprises virtualized memory resources that are abstracted to provide a memory pool.

15. The computer system according to claim 14, wherein the virtualized memory resources are abstracted by a cloud computing layer.

16. The computer system according to claim 10, wherein each storage node comprises a database connected to the multiplexed grid for communication with individual databases of each of the storage nodes for identifying one or more of the storage nodes in which a corresponding data unit is stored.

17. The computer system according to claim 10, wherein scheduling the copy operations comprises:

selecting, by a storage node in the domain, one or more of the storage nodes in the domain for the performance of the copy operations with respect to a corresponding data unit to be copied, wherein the storage nodes are selected based on a determination that a copy of the data unit to be copied is stored in one or more of the storage nodes, wherein a copy operation has not been performed on the data unit for an amount of time exceeding a predetermined threshold.

18. The computer system according to claim 10, wherein scheduling the copy operations comprises:
selecting, by a storage node in the domain, one or more of the storage nodes in the domain for the performance of the copy operations with respect to a corresponding data unit to be copied, wherein the storage nodes are selected based on a determination that the storage node itself stores a copy of the data unit to be copied, wherein a number of copies of the data unit stored in the storage node itself is less than that stored in any of the other storage nodes in the domain.

19. A computer program product for managing copy operations on data units in a hierarchical storage management system, the management system comprising an upper layer and a lower layer, wherein the upper layer comprises a domain in which storage nodes are arranged for communication in a multiplexed grid configuration, wherein each data unit is stored in one or more of the storage nodes, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to execute instructions to perform a method comprising:
determining, an N value for each data unit that represents a total number of copies of the data unit stored in the domain, wherein the determination is made based on data received over the multiplexed grid from one or more of the storage nodes respectively storing the copies;
scheduling copy operations with respect to each data unit based on comparison of the determined N value, wherein the scheduling copy operations comprises selecting a data unit from the nodes where the data unit have the determined N value less than any other N values before selecting another data unit from another node; and
performing the copy operations in accordance with the scheduling with respect to each data unit for respective migration of each data unit to the lower layer.

20. The computer program product according to claim 19, the method further comprising:
receiving, from a computing device connected to the management system, a write request corresponding to a data unit stored in one or more of the storage nodes, the data unit comprising an associated copy policy specifying one or more authorized storage nodes in which a copy of the data unit can be stored, wherein the copy policy further specifies a period of time during which the copy can be stored in the one or more authorized storage nodes; and
executing the write request to perform a corresponding write operation on the data unit in accordance with the copy policy and with respect to the one or more authorized storage nodes.

21. The computer program product according to claim 19, wherein performing the copy operations in accordance with the scheduling with respect to each data unit comprises limiting the number of times each data unit is copied from a respectively corresponding storage node to one.

22. The computer program product according to claim 19, wherein the lower layer comprises storage nodes that each have a data retrieval speed and a level of availability lower than that of any of the one or more storage nodes in the upper layer.

23. The computer program product according to claim 19, wherein the lower layer comprises virtualized memory resources that are abstracted to provide a memory pool.

24. The computer program product according to claim 23, wherein the virtualized memory resources are abstracted by a cloud computing layer.

25. The computer program product according to claim 19, wherein each storage node comprises a database connected to the multiplexed grid for communication with individual databases of each of the storage nodes for identifying one or more of the storage nodes in which a corresponding data unit is stored.

* * * * *